United States Patent
Heidari et al.

(10) Patent No.: US 8,223,859 B2
(45) Date of Patent: Jul. 17, 2012

(54) METHOD AND APPARATUS FOR A MULTI-TONE MODEM

(75) Inventors: Sam Heidari, Los Altos Hills, CA (US); Sivannarayana Nagireddi, Cupertino, CA (US); Sigurd Schelstraete, Menlo Park, CA (US); Avadhani Shridhar, Santa Clara, CA (US)

(73) Assignee: Ikanos Communications, Inc., Fremont, CA (US)

( * ) Notice: Subject to any disclaimer, the term of this patent is extended or adjusted under 35 U.S.C. 154(b) by 415 days.

(21) Appl. No.: 12/459,129

(22) Filed: Jun. 25, 2009

(65) Prior Publication Data

US 2010/0002755 A1    Jan. 7, 2010

Related U.S. Application Data

(60) Provisional application No. 61/075,727, filed on Jun. 25, 2008.

(51) Int. Cl.
*H04K 1/10* (2006.01)
*H04L 27/28* (2006.01)

(52) U.S. Cl. ........ 375/260; 375/222; 375/219; 375/220; 375/261; 375/346; 725/111

(58) Field of Classification Search .................. 375/260, 375/222, 219, 220, 261, 298, 349, 346; 725/111
See application file for complete search history.

(56) References Cited

U.S. PATENT DOCUMENTS

| | | | |
|---|---|---|---|
| 5,625,651 A | 4/1997 | Cioffi | |
| 6,091,932 A * | 7/2000 | Langlais | 725/111 |
| 6,473,438 B1 | 10/2002 | Cioffi et al. | |
| 2007/0121546 A1 | 5/2007 | Zuckerman et al. | |

* cited by examiner

*Primary Examiner* — Phuong Phu
(74) *Attorney, Agent, or Firm* — Mark J. Danielson; Pillsbury Winthrop Shaw Pittman LLP (57) ABSTRACT

A multi-tone modem with shared and discrete components forming a transmit path and a receive path configured to couple to a wired communication medium to communicate at least one multi-tone modulated communication channel thereon. The modem includes a multi-tone modulator component and a configurable frequency up converter component. The multi-tone modulator component is configured for multi-tone modulation and demodulation of a transmitted and received communication channel at a base band frequency range. The configurable frequency up converter component is coupled to the multi-tone modulator to selectably up convert the frequency range of the transmitted base band signal from the multi-tone modulator to that of a selected communication band and down convert received signals from the selected communication band to the base band for demodulation by the multi-tone modulator.

25 Claims, 8 Drawing Sheets

Network Module Processes

METHOD AND APPARATUS FOR A MULTI-TONE MODEM

CROSS REFERENCE TO RELATED APPLICATION

This application claims the benefit of prior filed Provisional Application No. 61/075,727 filed on Jun. 25, 2008 entitled "Frequency Duplexing for Simultaneous Multiple Channels in Home Networking" which is incorporated herein by reference in its entirety as if fully set forth herein.

BACKGROUND OF THE INVENTION

1. Field of Invention

The field of the present invention relates to multi-tone transceivers.

2. Description of the Related Art

A range of technologies have been developed for providing broadband access to homes, apartments and offices. These technologies include: passive optical network (PON), cable, satellite and digital subscriber line (DSL). Each technology relies on a different communications medium, either wired, wireless or fiber for the transport of data to the building. Broadband access inside the building is distributed to TV's, computers, or other devices by a wired or wireless connection. Wired router connections to each TV or computer are typically provided by Ethernet cables strung through the building. Wireless router connections are made through base stations and receivers. Existing home and business distribution networks include: copper/aluminum wire for phone connections, existing cable connections for cable TV in various rooms, and existing copper/aluminum wire by which electricity is provided throughout all the rooms of the home.

What is needed is a method and apparatus for improving the ease, security and coverage of broadband access provisioning to residential and business customers.

SUMMARY OF THE INVENTION

A method and apparatus is disclosed for a multi-tone modem configured to couple to a wire line and provide with selectable narrow band coverage across any of a number of selectable communication bands. The modem may be used singly or in combination with other like modems either to provide network coverage or to provide broadband coverage.

In an embodiment of the invention the multi-tone modem includes a plurality of shared and discrete components forming a transmit path and a receive path configured to couple to a wired communication medium to communicate at least one multi-tone modulated communication channel thereon. The multi-tone modem includes at least one multi-tone modulator component and at least one configurable frequency up converter component. The at least one multi-tone modulator component is configured for multi-tone modulation and demodulation of a transmitted and received communication channel at a base band frequency range. The at least one configurable frequency up converter component is coupled to the multi-tone modulator to selectably up convert the frequency range of the transmitted base band signal from the at least one multi-tone modulator to that of a selected communication band and down convert received signals from the selected communication band to the base band for demodulation by the multi-tone modulator, thereby allowing the multi-tone modem to support communications on at least any selected one of a plurality of frequency bands supported by the wired communication medium.

In another embodiment of the invention a method is disclosed for multi-tone modulation of at least one communication channel in a multi-tone modem with a plurality of shared and discrete components forming a transmit path and a receive path configured to couple to a wired communication medium, and the method comprising:

multi-tone modulating and demodulating a communication channel at a base band frequency range; and selectably up and down converting the multi-tone modulated communication channel between the base band frequency range of the multi-tone modulating and demodulating act and a frequency range of a selected communication band, thereby supporting communications on at least any selected one of a plurality of frequency bands supported by the wired communication medium.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

Figure 1A:
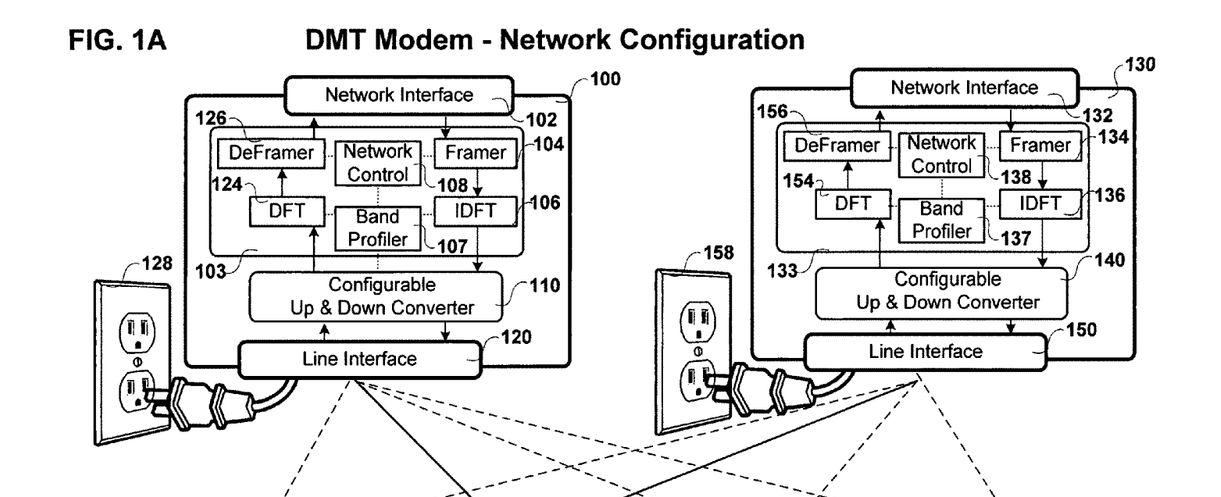
FIG. 1A is a hardware block diagram of a pair of narrow band discrete multi-tone (DMT) modems coupled to one another over a power line connection on a narrow multi-tone communication band.
Figure 1B:
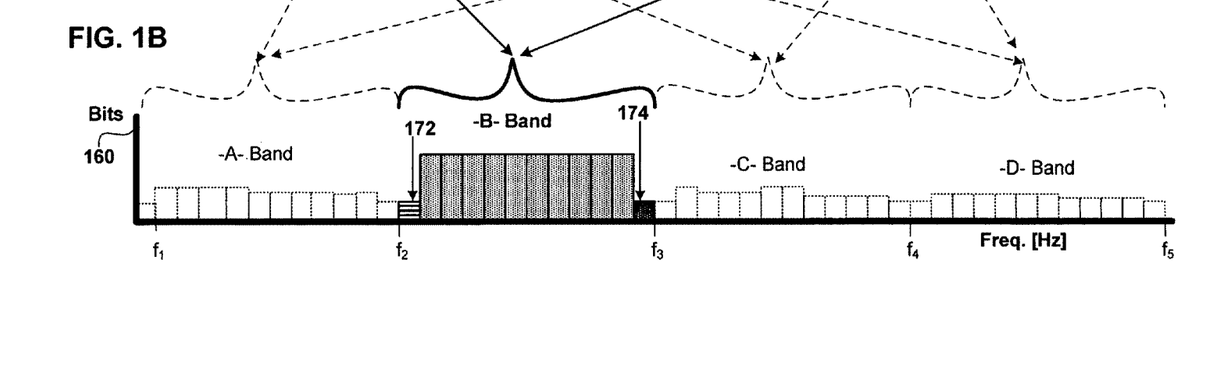
FIG. 1B is a graph showing the selected multi-tone communication band on which the modems shown in FIG. 1A communicate.

FIG. 1A is a hardware block diagram of a pair of narrow band discrete multi-tone (DMT) modems coupled to one another over a power line connection on a narrow multi-tone communication band. FIG. 1B is a graph showing the selected multi-tone communication band on which the networked modems shown in FIG. 1A communicate.

The pair of narrow band discrete multi-tone (DMT) modems 100 and 130 are shown network coupled to one another over a power line connection on a narrow multi-tone communication band 'B' shown on the graph 160. The selectable bands include bands A, B, C, D. The selected band 'B' spans the frequency range f2-f3 which represents a fractional part of the supported frequencies on the wired media to which the modem is coupled. A guard band portion of the selected band is shown comprising one or more tones, or sub-channels 172 and 174. These guard bands in an embodiment of the invention are used for relatively low bit rate transfer of network control channel information between two or more modems comprising the network. The guard bands also serve to isolate interference between all the bands which comprise the network in the absence of frame and symbol synchronization there between.

The wired medium is shown as a home or office alternating current (AC) power line accessible via wall sockets 128 and 158 to which the modems 100, 130 are respectively coupled. In alternate embodiments of the invention suitable wired communication mediums to which the modem may be coupled include, phone lines and co-axial cables.

Modem 100 includes an Ethernet or other suitable network interface 102, a multi-tone modulator 103, a configurable up and down converter 110 and an AC power line or other suitable line interface 120. In the embodiment shown the line interface 120 is a plug suitable for connecting to an AC wall socket. The multi-tone modulator includes on the transmit path: a framer 104 for framing a communication channel and an associated mapper and encoder (not shown). Additionally, an inverse discrete Fourier transform (IDFT) component transforms the multi-tone modulated communication channel from the frequency to the time domain at a base band frequency. On the receive path the multi-tone modulated received channel is transformed from the time to the frequency domain by the discrete Fourier transform (DFT) component 124 and decoded and demapped by an associated demapper and decoder (not shown) before deframing in deframer 126. The network controller 108 couples to all components of the multi-tone modulator 103 to implement a given network protocol, e.g. carrier sense multiple access (CSMA) packet based or master-slave point-to-point or point-to-multipoint. In an embodiment of the invention, the network controller utilizes any guard bands between selectable bands to relay network control information, such as master or slave communications across the associated guard bands of all its active communication bands, thereby aggregating the multiple discrete guard bands into a single virtual network control channel accessible to all modems on the network.

The optional band profiler 107 enables each modem to profile one or more of the selectable bands, e.g. bands A, B, C, D on the wired communication medium in terms for example of signal-to-noise ratio (SNR). This profiling allows a variegated selection of bands across the spectrum to be available for network communication and for other high interference bands to be avoided. In an embodiment of the invention the selectable bands need not be contiguous to one another nor evenly distributed in center frequency with respect to one another. In an embodiment of the invention the profiler operates on active and inactive bands to profile the SNR of same. In this embodiment of the invention the band profiler actively drives the up converter to different portions of the available spectrum on the wire line and profiles those portions for feedback over the network control channel to other modems in the network. In an alternate embodiment of the invention the profiler operates passively profiling only the active band (s) of the modem for feedback over the network control channel to other modems in the network.

The second of the pair of modems shown in FIG. 1, i.e. modem 130 includes similar components to those discussed above. Specifically a network interface 132, a multi-tone modulator 133, a configurable up and down converter 140 and a line interface 150. The multi-tone modulator includes the transmit path framer 134, a mapper and encoder (not shown) and an IDFT component 136. On the receive path the multi-tone modulated received channel is transformed from the time to the frequency domain by the DFT component 154 and decoded and demapped by an associated demapper and decoder (not shown) before deframing in deframer 156. The network controller 138 couples to all components of the multi-tone modulator 133 to implement a given network protocol, e.g. carrier sense multiple access (CSMA) packet based or master-slave point-to-point or point-to-multipoint. An optional band profiler 137 is also shown.

In an alternate embodiment of the invention each modem can include more than one narrow band modem, to expand its coverage capabilities to more than one selectable band simultaneously.

Figure 2A:
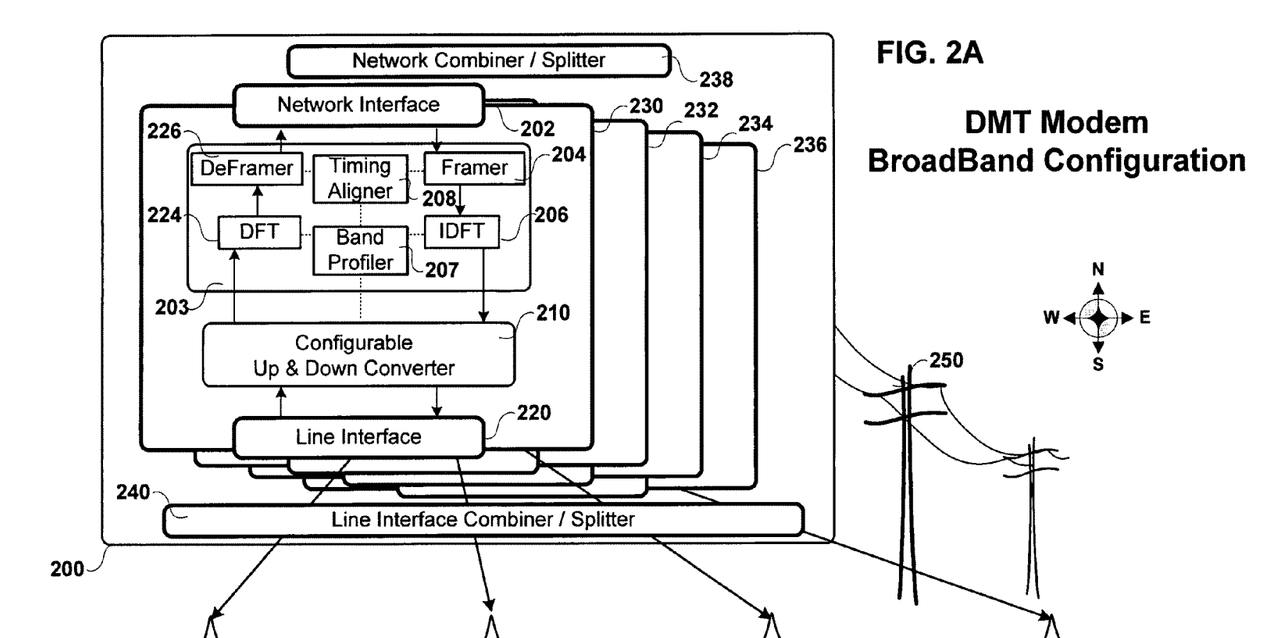
FIG. 2A is hardware block of a broadband modem incorporating several narrow band discrete multi-tone (DMT) modems coupled to one another for broadband digital subscriber line (DSL) communications over a single subscriber line.
Figure 2B:
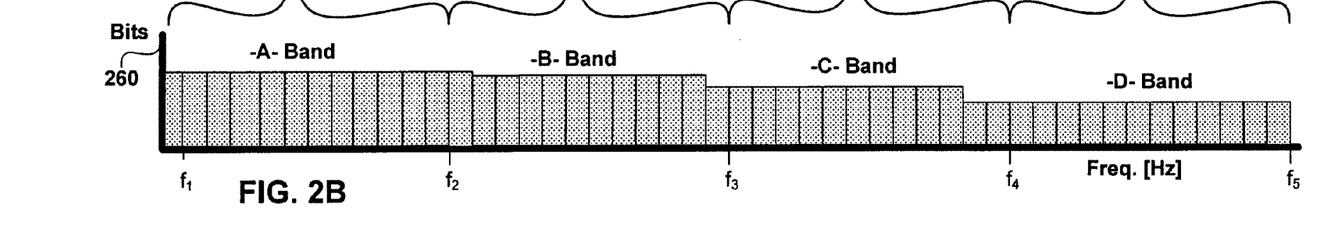
FIG. 2B is a graph showing the selected multi-tone communication bands on which the broadband modem shown in FIG. 2A communicates.

FIG. 2A is hardware block of a broadband modem incorporating several narrow band discrete multi-tone (DMT) modems 230, 232, 234, 236 coupled to one another for broadband digital subscriber line (DSL) communications over a single subscriber line 250. FIG. 2B is a graph 260 showing the selected multi-tone communication bands on which the broadband modem shown in FIG. 2A communicates. In an embodiment of the invention each narrow band DMT modem comprises a single integrated circuit chip coupled to one another to form the broadband modem via an associated Ethernet network combiner/splitter 238 and subscriber line combiner splitter 240. Each modem, or modem on a chip, contains components substantially identical to one another. The components of a representative one of the modems, i.e. modem 230 are shown.

Modem 230 includes: an Ethernet or other suitable network interface 202, a multi-tone modulator 203, a configurable up and down converter 210 and a subscriber line interface 220. The network interfaces of all modems 230-236 couples to the network combiner splitter 238. The subscriber line interfaces of all modems 230-236 couples to the subscriber line 250 via the line interface combiner/splitter 240.

The multi-tone modulator 203 includes on the transmit path: a framer 204 for framing a communication channel and an associated mapper and encoder (not shown). Additionally, an IDFT component transforms the multi-tone modulated communication channel from the frequency to the time domain at a base band frequency. On the receive path the multi-tone modulated received channel is transformed from the time to the frequency domain by the DFT component 224 and decoded and demapped by an associated demapper and decoder (not shown) before deframing in deframer 226. The timing aligner 208 couples to all components of the multi-tone modulator 203 and to the corresponding timing aligners (not shown) of each of the other modems 232-236 to align symbols, frames, and super frames of all narrow band modems and thereby allow seamless coverage of the available spectrum on the subscriber line, in an embodiment of the invention. In this embodiment of the invention, each timing aligner includes phase lock loop or other means for aligning timing signals across all narrow band multi-tone modems. As a result the contiguous selected bands of each of the modems may be combined into the seamless broadband coverage shown in FIG. 2B.

The optional band profiler 207 enables each modem to profile one or more of the selectable bands, e.g. bands A, B, C, D on the wired communication medium in terms for example of signal-to-noise ratio (SNR). This profiling allows a variegated selection of bands across the spectrum to be available for broadband subscriber line communication and for other high interference bands to be avoided. In an embodiment of the invention the selectable bands need not be contiguous to one another nor evenly distributed in center frequency with respect to one another.

In both FIG. 1A and FIG. 2A the number of bands is shown as four and the placement of same is shown as contiguous. This is done merely for purposes of exposition. In alternate embodiments of the invention anywhere from two to four or more bands can be selected by any narrow band modem without departing from the scope of the claimed invention. Additionally, the selectable bands may in alternate embodiments of the invention not be contiguous. In other embodiments of the invention the selectable bands may be separated from one another by center frequencies which are not integer multiples of one another.

Figures 3A, 3B, 3C, 3D:
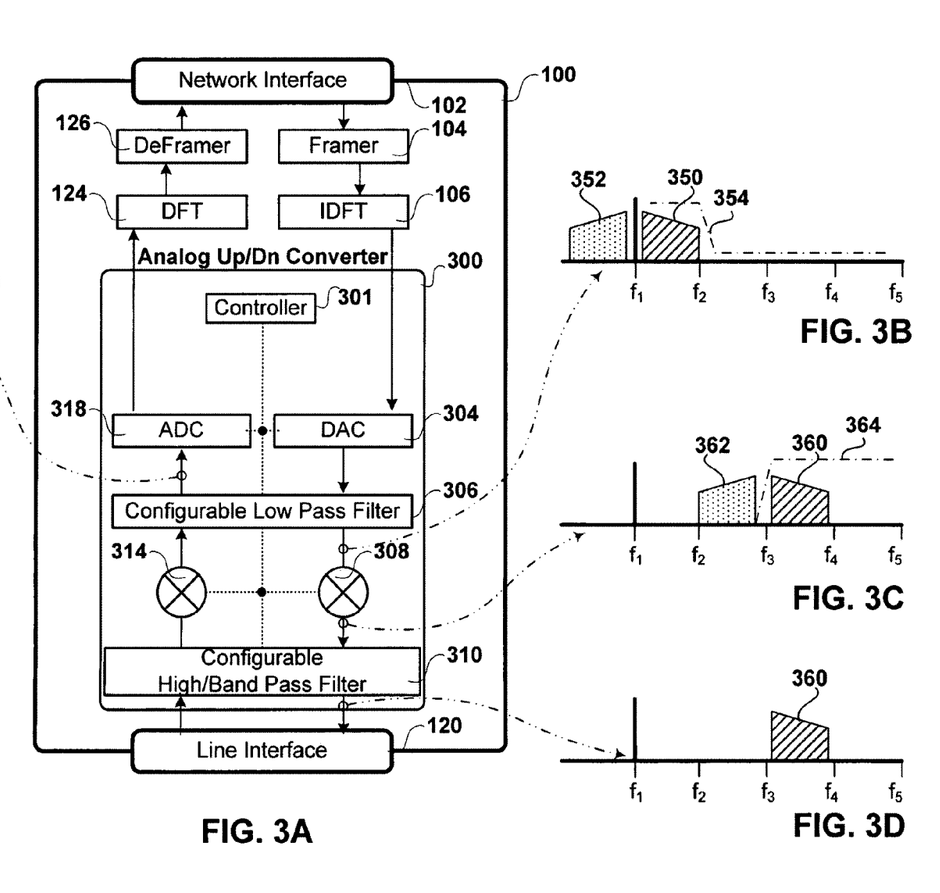
FIG. 3A is a detailed hardware block diagram of a narrow band multi-tone modem with an analog up/down converter.
FIG. 3B, FIG. 3C, FIG. 3D and FIG. 3F are graphs showing various phases of base band up conversion effected by the analog up converter of FIG. 3A.

FIG. 3A is a detailed hardware block diagram of a narrow band multi-tone modem with an analog up/down converter. The narrow band multi-tone modem 100 includes substantially the same components discussed above with respect to the modem 100 shown in FIG. 1A, specifically the network interface 102, the line interface 120, multi-tone modulator components comprising the framer 104, deframer 126, IDFT 106 and DFT 124 and an analog embodiment 300 of the up/down converter.

An expanded view of the analog up/down converter portion 300 of the modem includes on the transmit path a digital-to-analog converter (DAC) 304, a configurable low pass filter 306, a cosine modulator 308 and a configurable high/band pass filter 310. On the receive path the components include the configurable high/band pass filter 310, the cosine demodulator 314, the configurable low pass filter 306 and the analog-to-digital converter 318. The controller 301 controls the up/down conversion settings for up/down conversion between the base band and the selected band.

Figure 3E:
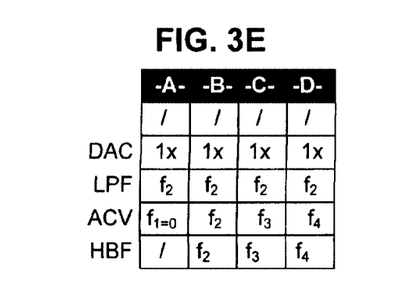
FIG. 3E is a table showing representative frequency settings for various components of the analog up converter for four selectable discrete communication bands.
Figure 3F:
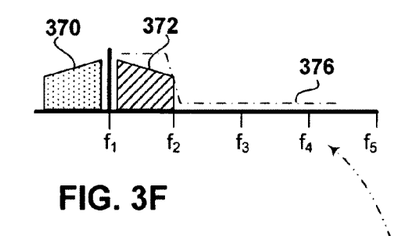

FIG. 3B, FIG. 3C, FIG. 3D and FIG. 3F are graphs showing various phases of base band up conversion effected by the analog up converter of FIG. 3A. In the example shown the selected band is band C with a frequency range from $f_3$ to $f_4$. FIG. 3B shows the signal profile at the junction between the output of the configurable low pass filter and the input of the cosine modulator. The positive and negative frequency portions 350 and 352 respectively, of the base band signal are shown. The low pass filter cutoff profile 354 is also shown proximate to the high frequency end of the base band signal and serving to filter out any high frequency images thereof. Next, FIG. 3C shows the communication channel after up conversion by the cosine modulator and before high/band pass filtration. The communication channel has two complementary portions 360 and 362 the former falling within the selected frequency range f3 to f4 associated with band C and the latter subject to high pass filtration the cutoff profile 364 for which is shown. FIG. 3D shows the spectral profile of the communication channel 360 after up conversion to the selected band and high pass filtration. On the receive path FIG. 3F shows the received communication channel 372 and its negative frequency reflection 370 after down conversion to base band and after low pass filtration the profile 376 for which is proximate the high frequency end of the down converted signal.

FIG. 3E is a table showing representative frequency settings for various components of the analog up converter for an embodiment of the invention with four selectable discrete communication bands. Exemplary settings for the DAC, low pass filter (LPF), analog up converter (ACV) and high/band pass filter (HBF) are shown.

Figures 4A, 4B, 4C, 4D, 4E, 4F, 4G:
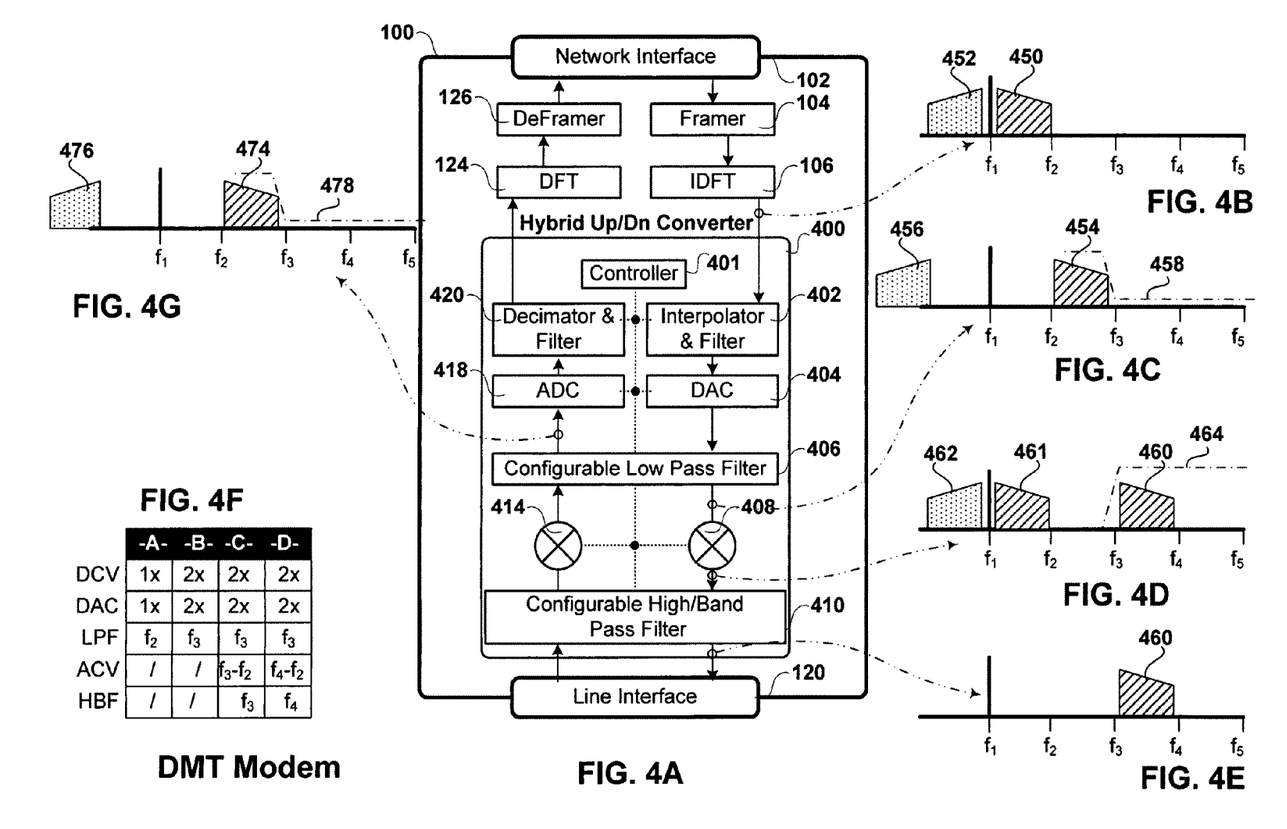
FIG. 4A is a detailed hardware block diagram of a narrow band multi-tone modem with a hybrid digital and analog up/down converter.
FIG. 4B, FIG. 4C, FIG. 4D, FIG. 4E and FIG. 4G are graphs showing various phases of base band up conversion effected by the hybrid up converter of FIG. 4A.
FIG. 4F is a table showing representative frequency settings for various components of the hybrid up converter for four selectable discrete communication bands.

FIG. 4A is a detailed hardware block diagram of a narrow band multi-tone modem with a hybrid digital and analog up/down converter. The narrow band multi-tone modem 100 includes substantially the same components discussed above with respect to the modem 100 shown in FIG. 1A, specifically the network interface 102, the line interface 120, multi-tone modulator components comprising the framer 104, deframer 126, IDFT 106 and DFT 124 and a hybrid embodiment 400 of the up/down converter.

An expanded view of the hybrid up/down converter portion 400 of the modem includes on the transmit path an interpolator 402 and associated filter, a DAC 404, a configurable low pass filter 406, a cosine modulator 408 and a configurable high/band pass filter 410. On the receive path the components include the configurable high/band pass filter 410, the cosine demodulator 414, the configurable low pass filter 406, the ADC 418 and the decimator 420 and associated filter. The controller 401 controls the up/down conversion settings for up/down conversion between the base band and the selected band.

The hybrid up/down converter, which comprises both digital and analog up and down conversion capabilities apportions the up and down conversion tasks in varying amounts to either or both the analog and digital stages. In an embodiment of the invention the digital up and down conversion exclusively handle conversion between base band and any selected one of the lower frequency half of the selectable bands and the analog and digital conversion stages together handle conversion between base band and any selected one of the upper frequency half of the selectable bands.

FIG. 4B, FIG. 4C, FIG. 4D, FIG. 4E and FIG. 4G are graphs showing various phases of base band up conversion effected by the hybrid up converter of FIG. 4A. In the example shown the selected band is band C with a frequency range from $f_3$ to $f_4$. FIG. 4B shows the base band signal profile at the output of the IDFT. This base band signal spectral profile comprising positive frequency base band signal 450 and its negative frequency counterpart 452 is common to all modem embodiments. FIG. 4C shows the intermediate band signal profile at the junction between the output of the configurable low pass filter and the input of the cosine modulator. The positive and negative frequency portions 454 and 456 respectively, of the digitally up converted intermediate band signal are shown. The up conversion performed digitally has the benefit of increasing the separation between the positive and negative frequency portions of the intermediate signal, thus relaxing the cutoff parameters for the high pass filtering which follows. FIG. 4C also shows the cutoff frequency profile 458 for the configurable low pass filter which filtered out any higher frequency images of the intermediate band signal. Next, FIG. 4D shows the communication channel after up conversion by the cosine modulator and before high pass filtration. The communication channel has two complementary images 462, 461 at $f_1$ and the selected band 462 falling within the selected frequency range $f_3$ to $f_4$ associated with band C and the latter subject to high pass filtration the cutoff profile 464 for which is shown. FIG. 4E shows the spectral profile of the communication channel 460 after up conversion to the selected band and high pass filtration. On the receive path FIG. 4G shows the received communication channel 474 and its negative frequency reflection 476 after the first phase of down conversion to an intermediate band as performed in the analog down converter, i.e. the cosine demodulator 414 and before low pass filtration the profile 478 for which is proximate the high frequency end of the intermediate band. The subsequent digital down conversion performed by the decimator and filter 420 completes the total down conversion to base band of the received signal.

FIG. 4F is a table showing representative frequency settings for various components of the hybrid up converter for four selectable discrete communication bands. Exemplary settings for the DAC, low pass filter (LPF), analog up converter (ACV) and high/band pass filter (HBF) are shown.

Figures 5A, 5B, 5C:
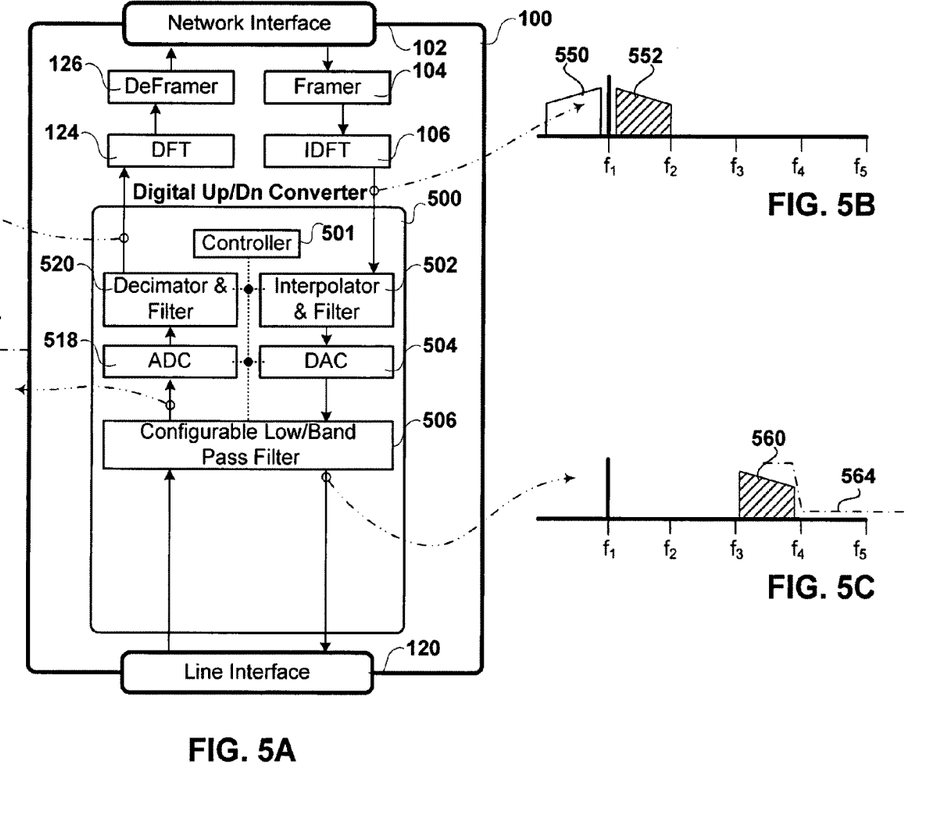
FIG. 5A is a detailed hardware block diagram of a narrow band multi-tone modem with a digital up/down converter.
FIG. 5B, FIG. 5C, FIG. 5E and FIG. 5F are graphs showing various phases of base band up conversion effected by the hybrid up converter of FIG. 5A.

FIG. 5A is a detailed hardware block diagram of a narrow band multi-tone modem with a digital up/down converter. The narrow band multi-tone modem 100 includes substantially the same components discussed above with respect to the modem 100 shown in FIG. 1A, specifically the network interface 102, the line interface 120, multi-tone modulator components comprising the framer 104, deframer 126, IDFT 106 and DFT 124 and a digital embodiment 500 of the up/down converter.

An expanded view of the digital up/down converter portion 500 of the modem includes on the transmit path an interpolator 502 and associated filter, a DAC 504 and the configurable low pass filter 506. On the receive path the components include the configurable low pass filter 506, the ADC 518 and the decimator 520 and associated filter. The controller 501 controls the up/down conversion settings for up/down conversion between the base band and the selected band.

Figure 5D:
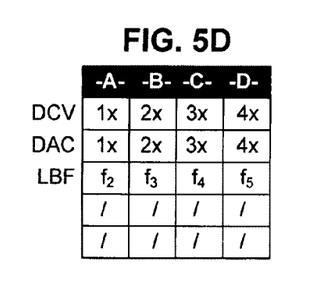
FIG. 5D is a table showing representative frequency settings for various components of the digital up converter for four selectable discrete communication bands.
Figure 5E:
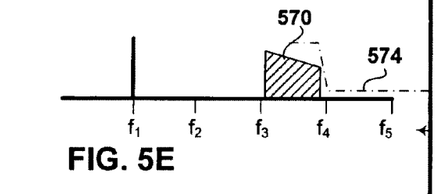
Figure 5F:
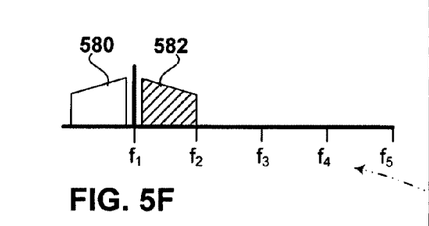

FIG. 5B, FIG. 5C, FIG. 5E and FIG. 5F are graphs showing various phases of base band up conversion effected by the hybrid up converter of FIG. 5A. In the example shown the selected band is band C with a frequency range from $f_3$ to $f_4$. FIG. 5B shows the base band signal profile at the output of the IDFT. This base band signal spectral profile comprising positive frequency base band signal 552 and its negative frequency counterpart 550 is common to all modem embodiments. FIG. 5C shows the selected bands signal profile at the output of the configurable low pass filter. The up conversion performed digitally has the benefit of increasing the separation between the positive and negative frequency portions of the resultant signal, in this case the selected band. FIG. 5C also shows the cutoff frequency profile 564 for the configurable low pass filter which filtered out any higher frequency images of the selected band signal. On the receive path FIG. 5E shows the received signal 570 after low pass filtration the cutoff profile 574 for which is shown. On the receive path FIG. 5F shows the received communication channel 582 and its negative frequency counterpart 580 after decimation by the decimator and filter 520 back to base band frequency.

FIG. 5D is a table showing representative frequency settings for various components of the digital up converter for four selectable discrete communication bands. Exemplary settings for the DAC, low pass filter (LPF), analog up converter (ACV) and high pass filter (HPF) are shown.

Figure 6A:
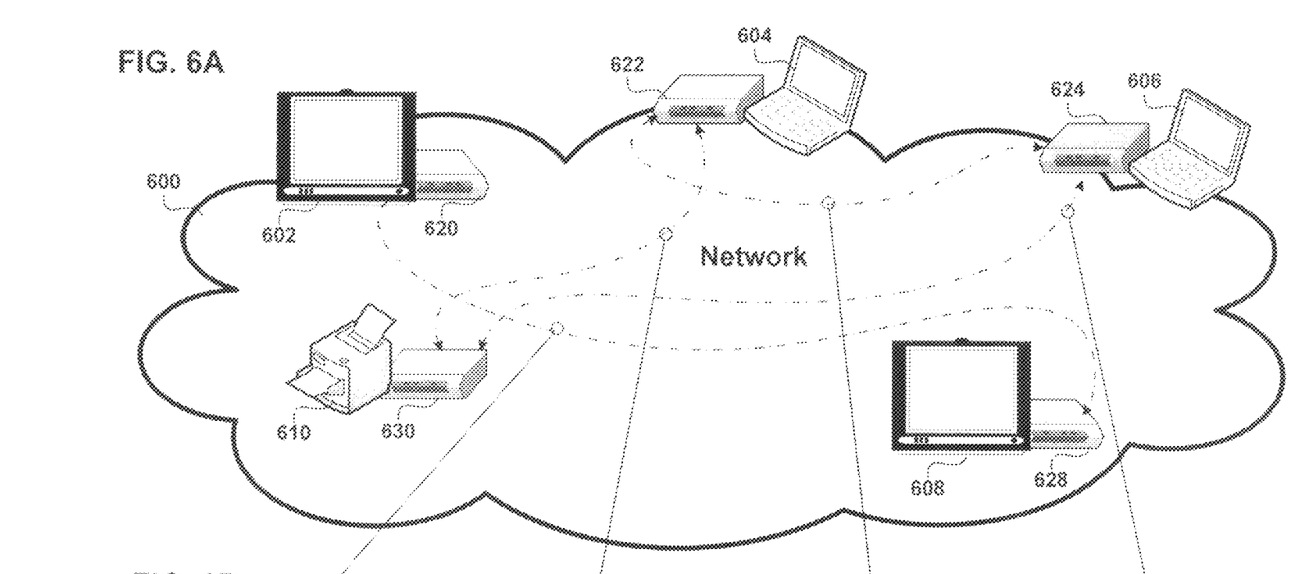
FIG. 6A is a network diagram of a plurality of the narrow band multi-tone modems shown in FIG. 1A network coupled to one another.
Figure 6B:
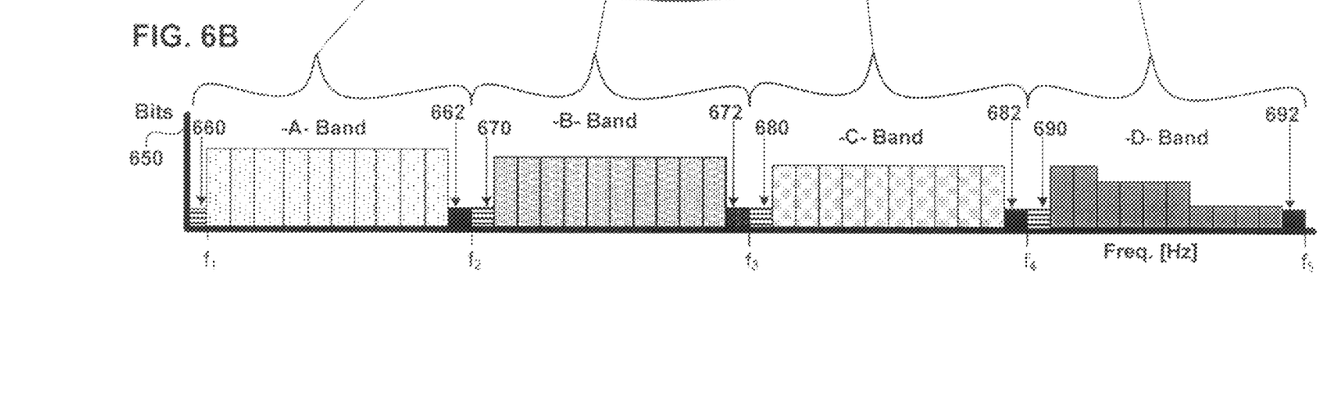
FIG. 6B is a graph showing the selected multi-tone communication bands on which the networked modems shown in FIG. 6A communicate.

FIG. 6A is a network diagram of a plurality of the narrow band multi-tone modems shown in FIG. 1A network coupled to one another. FIG. 6B is a graph 650 showing the selected multi-tone communication bands, A, B, C, D on which the networked modems shown in FIG. 6A communicate. Narrow band multi-tone modems 620, 622, 624, 628 and 630 are shown coupled to one another across a network 600. The physical connections which define the network may be either packet based, point-to-point or point-to-multipoint depending on the network protocol enabled by each modems network controller. Modems 620 and 628 are shown coupled to televisions 602 and 608 respectively. Modems 622 and 624 are shown coupled to notebook computers 604 and 606 respectively. Modem 630 is shown coupled to network printer 610.

In the example shown modem 620 is shown with a simplex broadcast connection to modem 628 over band A shown in FIG. 6B. Band A includes associated guard bands 660 and 662. Modems 622 and 624 communicate with over a duplex connection on band C shown in FIG. 6B. Band C includes associated guard bands 680, 682. Modems 622 and 624 also communicate with the network printer via modem 630 to which they are coupled via duplex connections on bands B and D respectively. Band B includes guard bands 670, 672. Band D includes guard bands 690, 692.

The guard bands shown in FIG. 6B serve two purposes. First the guard bands serve to isolate interference between all the bands which comprise the network in the absence of absolute frame and symbol synchronization there between. Second the guard bands in an embodiment of the invention are used for relatively low bit rate transfer of network control channel information between two or more modems comprising the network.

Figure 7:
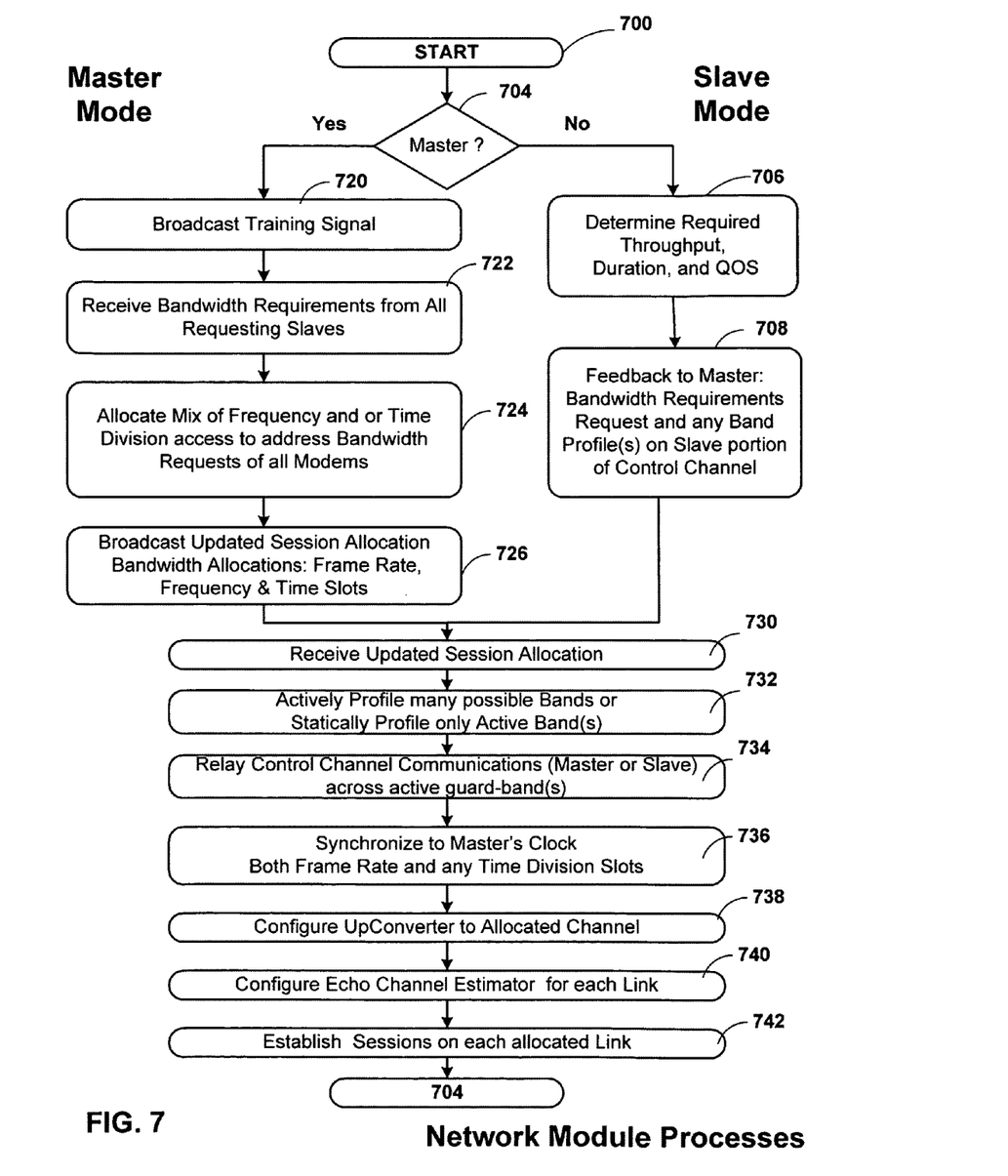
FIG. 7 is a process flow diagram for an embodiment of the invention in which the multi-tone modems are network coupled to one another.

FIG. 7 is a process flow diagram for an embodiment of the invention in which the multi-tone modems are network coupled to one another as shown in FIG. 1 and FIG. 6A. In an embodiment of the invention the network control module in each multi-tone modem dynamically determines whether to configure the modem into either master or slave mode. After initialization in start block 700 control passes to decision process 704. In decision process 704 the modem determines the network status, i.e. whether or not there is an existing master on the network to which it is coupled. If the modem itself is master then there is no change in status and control passes to master processes commencing with process 720. If the modem itself is not master, then the modem determines whether the master portion of the control channel is active, indicating another modem in the network is currently the active master in which control passes to slave processes commencing with process 706. Alternately, if the modem is not master, and the master control channel is not active then control passes to the first of the master processes, i.e. process 720.

If another modem is currently master then the modem enters slave mode the initial step of which is to determine required throughput, duration and quality of service (QOS) in process 706. Next in process 708, the modem in slave mode sends the bandwidth requirements determined in the prior step to the master as well as any band profile(s), e.g. signal-to-noise ratio (SNR) obtained in act 732. These are sent, in an embodiment of the invention on the slave portion of the control channel accessible to all modems on the network. In an embodiment of the invention the control channel comprises the master and slave portions of the guard bands of each active band, which are aggregated into a common control channel by means of each modem's relay of control channel information between guard bands of different active bands.

Alternately, if this modem is currently master or if no modem is currently master then the modem enters master mode the initial step of which is to seize the master portion of the control channel, e.g. the master portion of the active guard band(s) for this modem, and assert a training signal thereon in process 720. Then in process 722 the modem in master mode receives on the slave portion of the control channel the bandwidth requirements from all requesting slaves. Next in process 724 the network controller 108 (See FIG. 1) of the modem in master mode, determines a mix of frequency and or time division multiplexing of modem-to-modem channels which meets the bandwidth requirements of all modems including the master and requesting slaves. In an embodiment of the invention the master utilizes the band profiling feedback from one or more of the modems on the network to determine available bands for the network. In an embodiment of the invention dedicated frequency range(s) without time division multiplexing, are allocated to streaming media, e.g. video and audio, based on the relatively high data rates and QOS requirements of streaming media. Remaining portions of the frequency spectrum are sub-divided in either or both time and frequency to handle the access requirements of remaining links dedicated to intermittent file transfers such as computer-to-printer or computer-to-computer file transfer links. Then in process 726 the allocated channel a.k.a. session information is broadcast on the master portion of the control channel the bandwidth allocations determined in the prior step.

After the last dedicated master step 726 or slave step 708 the modem, whether in master or slave mode, executes processes commencing with process 730. In process 730 the modem updates its channel, a.k.a. session, allocation to correspond with the determination made by the master in process 724.

Next in process 732 the modem updates any existing profiles of one or more active or inactive bands accessible to it for subsequent feedback to the master one of the modems. The profiler in one embodiment of the invention operates passively, only obtaining a profile on the active band(s) for feedback over the network to the master and or other ones of the modems on the network. In another embodiment of the invention the profiler operates actively, driving the up converter to different portions of the available spectrum on the wire line and profiles those portions for feedback to a digital subscriber line access module (DSLAM) for improved broadband coverage or in a network context, over the network control channel to the master and or other ones of the modems on the network for utilization in allocating bands for networking. This profiling allows a variegated selection of bands across the spectrum to be identified as available for broadband or network communication based on communication characteristics such as interference level or signal-to-noise ratio (SNR) and for other high interference bands to be avoided. In an embodiment of the invention the selectable bands need not be active, nor contiguous to one another nor evenly distributed in center frequency with respect to one another.

Then in process 734 the modem's network controller, e.g. reference 108 in FIG. 1A, relays any non-duplicative master or slave communications across the associated guard bands of all its active communication bands, thus aggregating the multiple discrete guard bands into a single virtual control channel accessible to all modems on the network.

Then in process 736 all active bands are synchronized at a frame, symbol level and if appropriate time division slot level also using the master's synchronization signal broadcast on the master portion of the control channel to all active slave modems on the network. Then in process 738 any new band assignment results in a re-configuration of the up-converter portion of the modem to up-convert the modem's base band communication channel to the allocated communication band.

Next in process 740 echo channel estimation may be enabled to cancel out leakage from the transmit into the receive path of the modem, thereby allowing full duplex communications within each tone/sub-channel of the allocated communication channel. Next in process 742 sessions are established on each of the allocated network links. Control then returns to process 704 for a redetermination of the master's availability. If the master goes down at any time, or the bandwidth requirements of a slave or master change the processes are all repeated, thereby allowing the network to dynamically respond to either loss of a master, or to changing bandwidth requirements in real time, and without downtime on the network.

Figure 8:
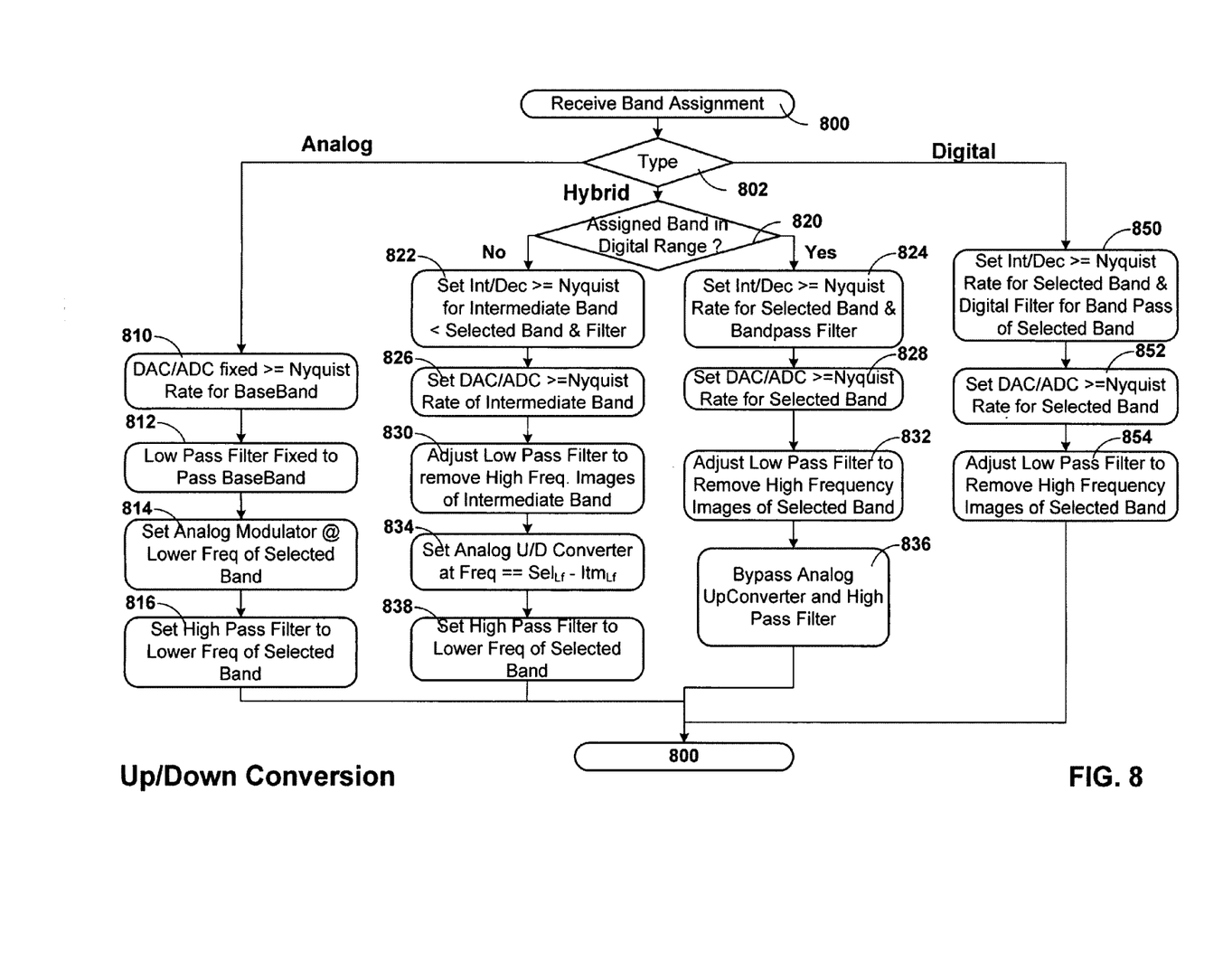
FIG. 8 is a process flow diagram for the processes effected by the three types of up/down converters, analog, hybrid, and digital.

FIG. 8 is a process flow diagram for the processes effected by the three types of up/down converters, i.e. analog, hybrid, and digital shown in FIG. 3, FIG. 4 and FIG. 5 respectively. When a band assignment is received in process 800 control passes to the branch of the process diagram which matches the physical characteristics of the modems up/down converter. In an embodiment this involves a type determination 802, in another embodiment of the invention the modem only includes firmware, software, or hardware for the processes associated with the appropriate one of the branches for its specific converter type.

For analog type up/down converters, e.g. converter 300 shown in FIG. 3A a conversion change commences at process 810. In process 810 the digital-to-analog converter (DAC) 304 on the transmit path and the analog-to-digital converter (ADC) 318 on the receive path both run at a fixed rate at greater than or equal to the Nyquist rate for the communication channel at base band. In process 812 the analog low pass filter 306 is also fixed at a frequency proximate to the high end of the base band, thereby filtering out any higher frequency images of the base band. In this analog embodiment the only configurable portions of the up/down converter are the analog portions and specifically the analog modulators, e.g. cosine modulator 308 and cosine demodulator 314 and the high pass filter 310. In process 814 the analog modulators are set to a frequency which upconverts the base band signal to the selected band and vice-versa. If the selected band is the base band then no modulation is required. In process 816 the high pass filter is also set at the lower frequency of the selected band.

For digital type up/down converters, e.g. converter 500 shown in FIG. 5A a conversion change commences at process 850. In process 850 the interpolator is set at or above the Nyquist rate for the selected band and an associated digital band pass filter is adjusted to pass the selected band and vice-versa for the decimator and associated filter. Next in process 852 the DAC 504 on the transmit path and the ADC 518 on the receive path are adjusted to a rate equal to or greater than the Nyquist rate for the selected band. In an alternate embodiment of the invention the DAC and ADC are fixed at a rate at or above the Nyquist rate for the highest frequency one of the selectable bands. Next in process 854 the analog low pass filter 506 is adjusted to remove high frequency images of the selected band.

For hybrid type up/down converters, e.g. converter 400 shown in FIG. 4A a conversion change commences at either process 822 or 824 as determined in decision process 820. The hybrid up/down converter, which comprises both digital and analog up and down conversion capabilities apportions the up and down conversion tasks in varying amounts to either or both the analog and digital stages. In an embodiment of the invention the digital up and down conversion exclusively handle conversion between base band and any selected one of the lower frequency half of the selectable bands and the analog and digital conversion stages together handle conversion between base band and any selected one of the upper frequency half of the selectable bands.

If conversion between the base and the selected band requires only the digital portion of the hybrid converter then processing commences at process 824. In process 824 the interpolator 402 is set at or above the Nyquist rate for the selected band and an associated digital band pass filter is adjusted to pass the selected band and vice-versa for the decimator and associated filter. Next in process 828 the DAC 404 on the transmit path and the ADC 418 on the receive path are adjusted to a rate equal to or greater than the Nyquist rate for the selected band. Next in process 832 the analog low pass filter 406 is adjusted to remove high frequency images of the selected band. In process 836 the analog up converter is either bypassed or set to values which do not alter the selected band.

If conversion between the base and the selected band requires both the digital portion of the hybrid converter as well as the analog portion, then processing commences at process 822. In process 822 the interpolator 402 is set at or above the Nyquist rate for an intermediate band, e.g. a frequency greater than that of the base band and less than that of the selected band. It will be the task of the digital portion of the up conversion to handle this portion of the overall up conversion. Next in process 826 the DAC on the transmit path and the ADC on the receive path are adjusted to a rate equal to or greater than the Nyquist rate for the intermediate band. Next in process 830 the analog low pass filter 406 is adjusted to remove high frequency images of the intermediate band. In process 834 the analog modulators are set to a frequency which upconverts the intermediate band signal to the selected band and vice-versa. This frequency is proportionate to the difference between the selected frequency and the intermediate frequency. In process 838 the high pass filter is also set at the lower frequency of the selected band.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A multi-tone modem with a plurality of shared and discrete components forming a transmit path and a receive path configured to couple to an alternating current (AC) power line wired communication medium to communicate at least one multi-tone modulated communication channel thereon, and the multi-tone modem comprising:
    at least one multi-tone modulator component configured for multi-tone modulation and demodulation of a transmitted and received communication channel at a base band frequency range;
    at least one configurable frequency up converter component coupled to the multi-tone modulator to selectably up convert the frequency range of the transmitted base band signal from the at least one multi-tone modulator to that of a selected communication band and down convert received signals from the selected communication band to the base band for demodulation by the multi-tone modulator, thereby allowing the multi-tone modem to support communications on at least any selected one of a plurality of frequency bands supported by the power line; and
    a line interface for connecting to the power line through an AC power socket.

2. The multi-tone modem of claim 1, wherein further:
    the at least one multi-tone modulator component includes a first multi-tone modulator component and a second multi-tone modulator component each modulating a discrete communication channel at the base band frequency range; and
    the at least one frequency up converter component includes a first frequency up converter component and a second frequency up converter component each coupled to a corresponding one of the first and second multi-tone modulator components for selectably up converting a corresponding discrete communication channel from the base band to a corresponding one of two discrete selected communication bands, thereby allowing the multi-tone modem to support communications on two discrete selected ones of the plurality of discrete frequency bands supported by the power.

3. The multi-tone modem of claim 1, wherein the at least one multi-tone modulator further comprises:
    a band profiler coupled to the at least one configurable frequency up converter component to drive the up converter component to different portions of the available spectrum on the power line and to profile those portions of the spectrum having communication characteristics suitable for band selection, thereby allowing a selection of bands across the available spectrum on the power line to be identified as available for broadband or network communication and for other high interference bands to be avoided.

4. The multi-tone modem of claim 1, wherein the at least one multi-tone modulator further comprises:
    a network controller component utilizing available guard bands between selectable bands on the power line to relay network control information between modems thereby aggregating the multiple discrete guard bands into a single virtual network control channel accessible to all modems on the network.

5. A multi-tone modem with a plurality of shared and discrete components forming a transmit path and a receive path configured to couple to a wired communication medium to communicate at least one multi-tone modulated communication channel thereon, and the multi-tone modem comprising:
    at least one multi-tone modulator component configured for multi-tone modulation and demodulation of a transmitted and received communication channel at a base band frequency range;
    at least one configurable frequency up converter component coupled to the multi-tone modulator to selectably up convert the frequency range of the transmitted base band signal from the at least one multi-tone modulator to that of a selected communication band and down convert received signals from the selected communication band to the base band for demodulation by the multi-tone modulator, thereby allowing the multi-tone modem to support communications on at least any selected one of a plurality of frequency bands supported by the wired communication medium, wherein the at least one multi-tone modulator further comprises:
a timing aligner configured to align symbols, frames and superframes of multi-tone modulated bands of a plurality of multi-tone modems coupled to one another to one another, thereby supporting broadband coverage of the available spectrum on the wired communication medium based on a seamless combination of contiguous bands from each of the plurality of multi-tone modems.

6. The multi-tone modem of claim 1, wherein the at least at least one configurable frequency up converter component comprises:
at least one of a digital up converter and an analog up converter.

7. A method for multi-tone modulation of at least one communication channel in a multi-tone modem with a plurality of shared and discrete components forming a transmit path and a receive path configured to couple to an alternating current (AC) power line wired communication medium, and the method comprising:
multi-tone modulating and demodulating a communication channel at a base band frequency range;
selectably up and down converting the multi-tone modulated communication channel between the base band frequency range of the multi-tone modulating and demodulating act and a frequency range of a selected communication band, thereby supporting communications on at least any selected one of a plurality of frequency bands supported by the power line; and
a line interface for connecting to the power line through an AC power socket.

8. The method of claim 7, wherein the multi-tone modulating and demodulating act and the selectable up and down converting acts further comprise:
multi-tone modulating and demodulating two discrete communication channels at the base band frequency range; and
up and down converting the two discrete communication channels between the base band frequency range and a corresponding one of two discrete selected communication bands, thereby supporting communications on any selected two of a plurality of discrete frequency bands supported by the power line.

9. The method of claim 7, further comprising:
profiling those portions of the spectrum on the power line having communication characteristics suitable for band selection, and
identifying bands across the available spectrum on the power line as available for broadband or network communication based on the profiling act.

10. The method of claim 7, further comprising:
utilizing available guard bands between selectable communication bands on the power line for transport of network control information; and
relaying network control information across guard bands of a selected communication band, thereby aggregating multiple discrete guard bands into a single virtual network control channel accessible to a plurality of multi-tone modulated modems on a network.

11. A method for multi-tone modulation of at least one communication channel in a multi-tone modem with a plurality of shared and discrete components forming a transmit path and a receive path configured to couple to a wired communication medium, and the method comprising:
multi-tone modulating and demodulating a communication channel at a base band frequency range;
selectably up and down converting the multi-tone modulated communication channel between the base band frequency range of the multi-tone modulating and demodulating act and a frequency range of a selected communication band, thereby supporting communications on at least any selected one of a plurality of frequency bands supported by the wired communication medium;
aligning symbol, frame, and superframe timing across a plurality of multi-tone modulated modems coupled to one another, and
combining contiguous selected bands from each of the plurality of multi-tone modulated modems aligned in the aligning act into a broadband coverage of the available spectrum on the wired communication medium.

12. A means for multi-tone modulation of at least one communication channel in a multi-tone modem with a plurality of shared and discrete components forming a transmit path and a receive path configured to couple to an alternating current (AC) power line wired communication medium, and the means comprising:
means for multi-tone modulating and demodulating a communication channel at a base band frequency range;
means for selectably up and down converting the multi-tone modulated communication channel between the base band frequency range of the multi-tone modulating and demodulating means and a frequency range of a selected communication band, thereby supporting communications on at least any selected one of a plurality of frequency bands supported by the power line; and
means for interfacing with the power line through an AC power socket.

13. The means of claim 12, wherein the multi-tone modulating and demodulating means and the selectable up and down converting means further comprise:
means for multi-tone modulating and demodulating two discrete communication channels at the base band frequency range; and
means for up and down converting the two discrete communication channels between the base band frequency range and a corresponding one of two discrete selected communication bands, thereby supporting communications on any selected two of a plurality of discrete frequency bands supported by the power line.

14. The means of claim 12, further comprising:
means for profiling those portions of the spectrum on the power line having communication characteristics suitable for band selection, and
means for identifying bands across the available spectrum on the power line as available for broadband or network communication based on the profiling means.

15. The means of claim 12, further comprising:
means for utilizing available guard bands between selectable communication bands on the power line for transport of network control information; and
means for relaying network control information across guard bands of a selected communication band, thereby aggregating multiple discrete guard bands into a single virtual network control channel accessible to a plurality of multi-tone modulated modems on a network.

16. A means for multi-tone modulation of at least one communication channel in a multi-tone modem with a plurality of shared and discrete components forming a transmit path and a receive path configured to couple to a wired communication medium, and the means comprising:
means for multi-tone modulating and demodulating a communication channel at a base band frequency range;

means for selectably up and down converting the multi-tone modulated communication channel between the base band frequency range of the multi-tone modulating and demodulating means and a frequency range of a selected communication band, thereby supporting communications on at least any selected one of a plurality of frequency bands supported by the wired communication medium;

means for aligning symbol, frame, and superframe timing across a plurality of multi-tone modulated modems coupled to one another, and means for combining contiguous selected bands from each of the plurality of multi-tone modulated modems aligned in the aligning means into a broadband coverage of the available spectrum on the wired communication medium.

17. The multi-tone modem of claim 5, wherein further:

the at least one multi-tone modulator component includes a first multi-tone modulator component and a second multi-tone modulator component each modulating a discrete communication channel at the base band frequency range; and the at least one frequency up converter component includes a first frequency up converter component and a second frequency up converter component each coupled to a corresponding one of the first and second multi-tone modulator components for selectably up converting a corresponding discrete communication channel from the base band to a corresponding one of two discrete selected communication bands, thereby allowing the multi-tone modem to support communications on two discrete selected ones of the plurality of discrete frequency bands supported by the wired communication medium.

18. The multi-tone modem of claim 5, wherein the at least one multi-tone modulator further comprises:

a band profiler coupled to the at least one configurable frequency up converter component to drive the up converter component to different portions of the available spectrum on the wired communication medium and to profile those portions of the spectrum having communication characteristics suitable for band selection, thereby allowing a selection of bands across the available spectrum on the wired communication medium to be identified as available for broadband or network communication and for other high interference bands to be avoided.

19. The multi-tone modem of claim 5, wherein the at least one multi-tone modulator further comprises:

a network controller component utilizing available guard bands between selectable bands on the wired communication medium to relay network control information between modems thereby aggregating the multiple discrete guard bands into a single virtual network control channel accessible to all modems on the network.

20. The method of claim 11, wherein the multi-tone modulating and demodulating act and the selectable up and down converting acts further comprise:

multi-tone modulating and demodulating two discrete communication channels at the base band frequency range; and up and down converting the two discrete communication channels between the base band frequency range and a corresponding one of two discrete selected communication bands, thereby supporting communications on any selected two of a plurality of discrete frequency bands supported by the wired communication medium.

21. The method of claim 11, further comprising:

profiling those portions of the spectrum on the wired communication medium having communication characteristics suitable for band selection, and identifying bands across the available spectrum on the wired communication medium as available for broadband or network communication based on the profiling act.

22. The method of claim 11, further comprising:

utilizing available guard bands between selectable communication bands on the wired communication medium for transport of network control information; and relaying network control information across guard bands of a selected communication band, thereby aggregating multiple discrete guard bands into a single virtual network control channel accessible to a plurality of multi-tone modulated modems on a network.

23. The means of claim 16, wherein the multi-tone modulating and demodulating means and the selectable up and down converting means further comprise:

means for multi-tone modulating and demodulating two discrete communication channels at the base band frequency range; and means for up and down converting the two discrete communication channels between the base band frequency range and a corresponding one of two discrete selected communication bands, thereby supporting communications on any selected two of a plurality of discrete frequency bands supported by the wired communication medium.

24. The means of claim 16, further comprising:

means for profiling those portions of the spectrum on the wired communication medium having communication characteristics suitable for band selection, and means for identifying bands across the available spectrum on the wired communication medium as available for broadband or network communication based on the profiling means.

25. The means of claim 12, further comprising:

means for utilizing available guard bands between selectable communication bands on the wired communication medium for transport of network control information; and means for relaying network control information across guard bands of a selected communication band, thereby aggregating multiple discrete guard bands into a single virtual network control channel accessible to a plurality of multi-tone modulated modems on a network.

* * * * *

UNITED STATES PATENT AND TRADEMARK OFFICE
CERTIFICATE OF CORRECTION

PATENT NO.         : 8,223,859 B2
APPLICATION NO.    : 12/459129
DATED              : July 17, 2012
INVENTOR(S)        : Heidari et al.

It is certified that error appears in the above-identified patent and that said Letters Patent is hereby corrected as shown below:

In Column 12, Line 27, in Claim 2, delete "power." and insert -- power line. --, therefor.

In Column 13, Lines 5-6, in Claim 5, delete "to one another to one another," and insert -- to one another, --, therefor.

In Column 13, Lines 10-11, in Claim 6, delete "at least at least" and insert -- at least --, therefor.

Signed and Sealed this
Fifteenth Day of January, 2013

David J. Kappos
*Director of the United States Patent and Trademark Office*